Aug. 2, 1955 G. N. BLISS 2,714,523
EGG LIFTER
Filed April 10, 1952 2 Sheets-Sheet 1
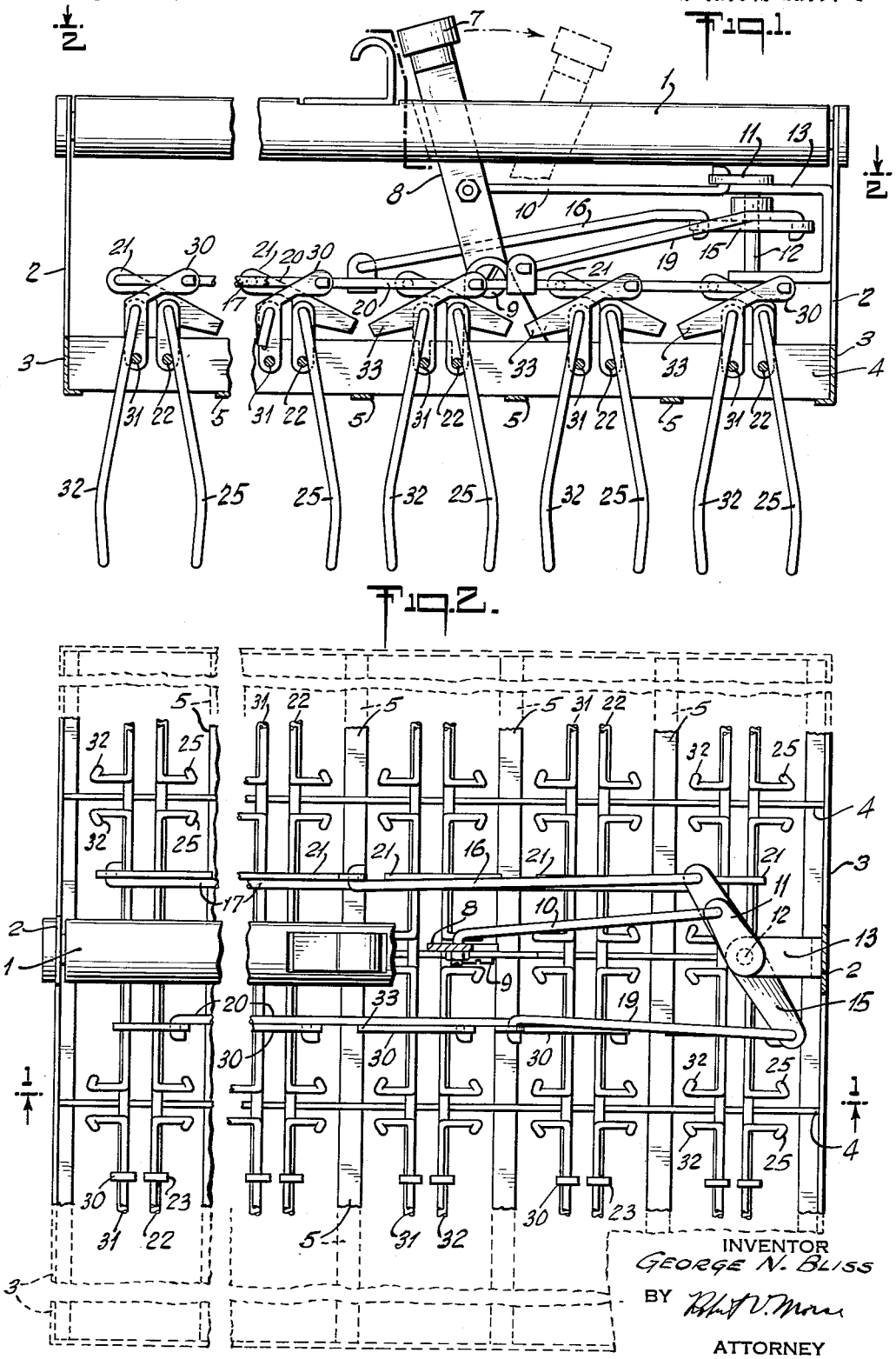
INVENTOR
GEORGE N. BLISS
BY
ATTORNEY

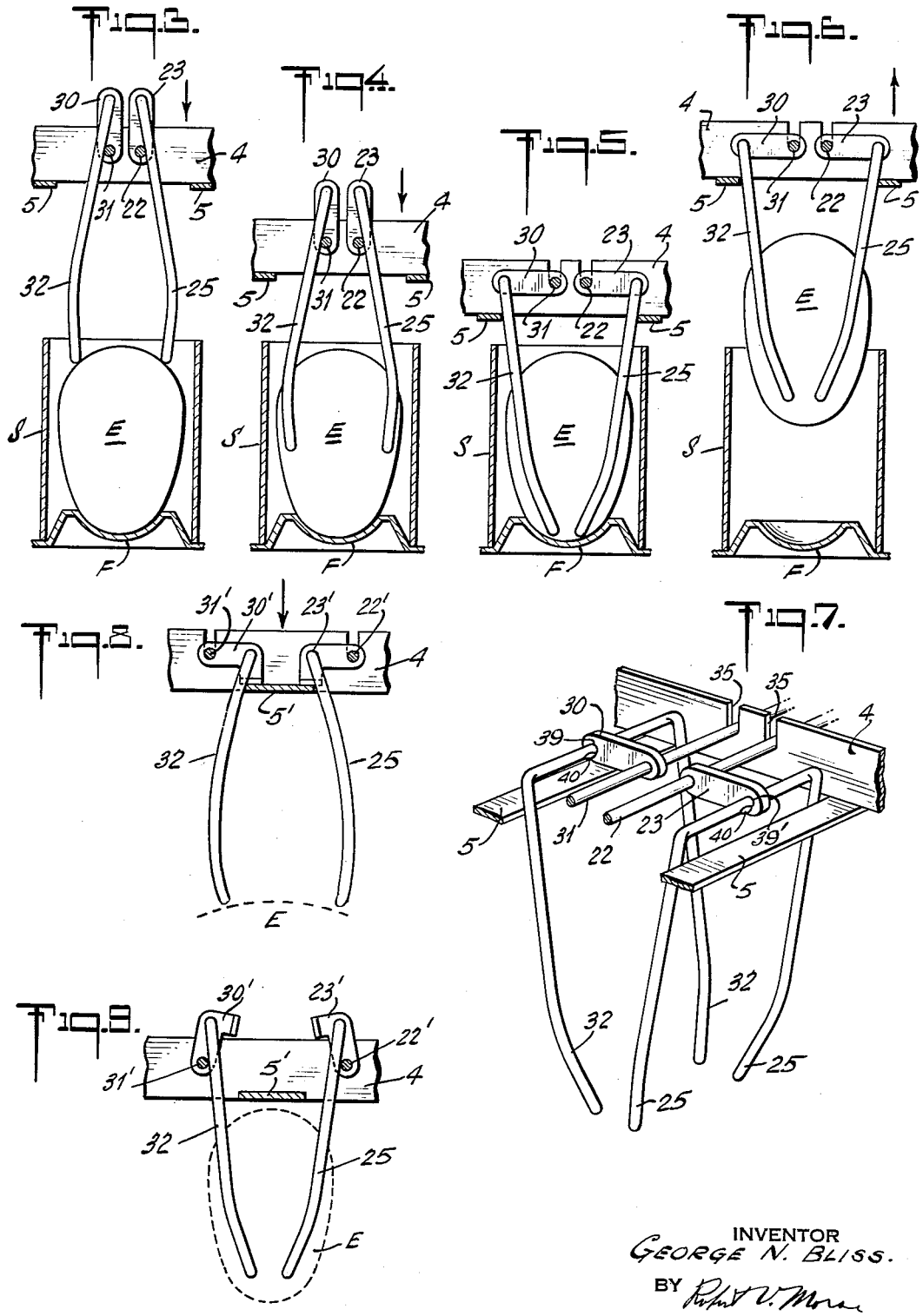

United States Patent Office 2,714,523
Patented Aug. 2, 1955

2,714,523

EGG LIFTER

George N. Bliss, Ithaca, N. Y.

Application April 10, 1952, Serial No. 281,640

8 Claims. (Cl. 294—87)

This invention relates to multiple lifting devices such as used for example to pick up a number of eggs at one time so that the handling of eggs in quantity can be facilitated. Crated eggs usually come on cardboard trays called "flats" and are packed in layers. Each egg is in a separate rectangular cell formed by cardboard separator strips, and generally the eggs rest in individual cups or depressions formed in the cardboard flat. There are usually thirty-six eggs to a flat; and as they need to be lifted out and carried about for processing, various forms of multiple lifters have been devised and are in general use.

Eggs vary in size and shape and often fit rather tightly in the rectangular cardboard cells while others may be loose in the cell and fall around to various positions. One of the problems of multiple lifters is to avoid forcing or slicing the egg, as the shell is delicate and a leaky egg can cause considerable delay and trouble where machinery must ge kept clean. Pneumatic lifters with suction cups have been used but they are limited in portability; and most eggs are now carried in purely mechanical lifting devices having multiple lifting prongs or strips. Since many eggs fit tightly in their square cardboard cells, there is little room to insert lifting prongs or strips except where the egg curves away from the corners. Though some devices on the market use slats dropped down between entire rows of eggs, there is then always danger of slicing or crushing some egg shell and accordingly many lifters use curved prongs to insert around the egg.

If a curved prong is pushed directly down, its curvature (in projection as viewed from above) necessarily takes up considerable space; and in this problem space is strictly limited. But a curved wire can be inserted around an egg in a tight rectangular space without pressure, provided that the wire is both slid downward and allowed to swing freely at the same time; that is, to be free and loose as it is pushed so that it can find its own way down thru what space theremay be around each particular egg. There have been many attempts to do this; but they have either held the upper parts of the prongs in rather fixed relation, or have interposed laterally fixed intermediate fulcrums to hold the sliding prongs, so they were not free.

The present invention is characterized by loosely hung prongs having practically universal freedom, together with limiting fulcrum or stop means which only operate at the extreme locking or unlocking positions, while leaving the prongs entirely free during their inserting so that they can feel their way without lateral stress. Instead of being guided, they can thus guide themselves downward around the egg. It is then possible to use rigid prongs or fingers, whereas most prior devices had to use flexible fingers in order to accommodate themselves to the conditions. The extra physical work absorbed in operating a large number of flexible elements is a disadvantage of such prior types.

In general the purpose of the present invention is to improve multiple lifters by reducing the amount of work required, avoiding breakage, and eliminating unnecessary cost and complexity. The invention provides a light and effective mechanism which is easy to handle and is adaptable to eggs of varying sizes and positions.

Referring now to the drawings forming part of this specification,

Fig. 1 is a side elevation partly in section showing the handle and the reversible driving mechanism and a portion of the lifting mechanisms comprising a number of lifting units which by repetition may be built up to any length and width desired.

Fig. 2 is a plan view partly in section of the mechanism shown in Fig. 1.

Fig. 3 is a transverse view across the reversible drive shafts of a unit showing the prongs spread apart sufficiently to start engaging an egg in its cardboard cell.

Fig. 4 shows the free action of the prongs as the lifter is pressed down into the cardboard cell around the egg. The prongs swing freely out but the operating shafts and pivots remain in the same position as Fig. 3.

Fig. 5 shows the prongs all the way down and with the lower ends of the prongs swung inward to embrace the egg by the action of the cranks spreading the top of the prongs apart against fulcrums so as to force the lower ends of the prongs closer together.

Fig. 6 shows the egg gripped as in Fig. 5 being lifted out of the rectangular cardboard cell.

Fig. 7 is a perspective view of one of the lifting units showing the loose curved lifting prongs and a pair of cranks. These are shown in the gripping or lifting position corresponding to Fig. 5 and Fig. 6.

Fig. 8 illustrates a modification in which the operating cranks are horizontal when the egg is first touched, being the initial engaging position corresponding to Fig. 3.

Fig. 9 is similar to Fig. 8 but shows the position when the egg is being gripped and lifted, corresponding to the step shown in Fig. 5. The modifications shown in Fig. 8 and Fig. 9 are a reverse type of construction from that shown in Fig. 3 to Fig. 5 but attain the same result so far as loosely engaging and finally gripping the egg is concerned.

Similar reference numerals refer to similar parts thruout the various views.

Referring first to Fig. 1 and Fig. 2, the handle 1 having uprights 2 carries a lifting frame 3 of lattice-like construction having cross-bars 4 and stop-bars 5 (shown in section) at right angles thereto so as to form a number of rectangular openings in the frame corresponding to the number of square holes or cells on the flats from which the eggs are to be lifted. Usually there are thirty-six of these, though the lifters can be built with whatever number of units is desired. The lattice structure of the frame 3 also permits the operator to look thru it to insert the lifters in the proper cells. Each of the rectangular openings in the lattice frame 3 contains a gripping mechanism capable of lifting a rounded object such as an egg from a rectangular hole such as the cells in which eggs are packed. These lifting mechanisms will be described later, but in general involve prongs moved in opposite directions to grip or release the egg.

To give such motions there is provided a control button 7 near the handle 1 which operates a lever 8 pivoted at 9 to the frame 3. From this lever 8 a link 10 leads to an arm 11 on a vertical shaft 12 mounted in a bearing in the bracket 13 which is secured to one of the uprights 2 of the frame 3. A cross-arm 15 is secured at its center to the shaft 12, with the two ends of the arm extending in opposite directions so that when the arm 15 is rocked by the lever 8, link 10 and arm 11, the two ends of the cross-arm 15 will move in opposite directions.

One end of the arm 15 thru the link 16 drives the cross-rod 17 in one direction while the other end of the arm 15 thru the link 19 drives the cross-rod 20 in the opposite direction. These opposite motions, thru suitable interconnections, permit the lifting prongs to move in opposite directions to grip or release as desired.

For example, in the form shown in Fig. 1 the rod 17 drives the crank 21 which is attached to the shaft 22 pivoted in suitable bearings in the cross-bars 4 of the frame 3. Secured to the shaft 22 is a crank 23 carrying loosely at its other end the prongs 25. Similar connections are made to all the shafts 22 extending thru the cross-bars 4 of the frame so that all the prongs 25 are operated in unison.

On the other hand, the rod 19 moves in the opposite direction the cross-rod 20 which drives the cranks 30 on all the shafts 31, these cranks carrying the prongs 32. Projections 33 on the cranks 30 act as limit stops when they strike the bars 5. The prongs in each unit are thus moved toward each other or away from each other as desired, all the units operating simultaneously.

Prior devices have been made with various forms of prongs operated in unison, but such prongs, if rigid, have been constrained in their motion; and if flexible, they have caused fatigue because of the energy lost in continually flexing a large number of them. To reduce breakage and fatigue, the prongs in the present invention function in a particular manner as follows.

Referring now to Fig. 7 which illustrates in perspective one of the units, the rockshafts 22 and 31 are journaled in suitable notches 35 in the cross-bar 4. Secured to the shafts 22 and 31 are the cranks 23 and 30 respectively, which can be turned by the shafts from the horizontal position shown to both upright, the shafts then making a quarter turn in opposite directions. Near the outer ends of each crank are pivot holes 39 and 39' in which are loosely hung U-shaped wire prongs 25 and 32. These prongs, while hung so as to curve toward each other, are otherwise similar in construction, being made of rigid wire with smoothly rounded tips at the lower ends and cross-bars at the top which pass thru the pivot holes 39 and 39' in the cranks. The prongs are centered by small projections 40 each side of the crank hole, and can swing freely to and from each other. When not limited by stops, this gives the prongs the capacity to guide themselves freely around the surface of a rounded body such as an egg when forced down around it. However, in Fig. 7 the prongs are shown in the gripping position forced against the stop-bars 5 which compel the tips of the prongs 25 to move towards the tips 32 so as to grasp and hold the object between them. This corresponds to the operation shown in Fig. 5 and Fig. 6.

The initial engaging operation is shown in Fig. 3 and Fig. 4, in which it will be noted that the cranks 23 and 30 are vertical instead of horizontal as in Fig. 5, Fig. 6 and Fig. 7. In Fig. 3, Fig. 4, Fig. 5 and Fig. 6 an egg E is shown in a rectangular cell composed of a cardboard tray or flat F at the bottom and walls of cardboard separator strips S, such cells being open at the top to insert or withdraw the eggs. Referring now more particularly to Fig. 3, the rockshafts 22 and 31 have been turned so that their attached cranks 23 and 30 are in an upright position, this being the position when the lever 7—8 of Fig. 1 is at the left. It will be seen from Fig. 3 that under such conditions the prongs 25 and 32 rest against the shafts 22 and 31 so that the prongs are not allowed to swing closely together but are held apart sufficiently so that when they come in contact with the rounded upper surface of an egg they will start to spread apart and slide down around it instead of puncturing the shell. In other words, minimum limit stops are provided; and in the construction shown in Fig. 1 to Fig. 6 inclusive the rockshafts 22—31 serve that purpose as well as turning the cranks. While the shafts 22—31 limit the prongs from swinging too far inward, it will be noted that they do not in any way restrict the prongs from swinging freely outward away from each other, since the prongs are loosely pivoted in the upper ends of the cranks 23 and 30.

This freedom of the prongs to swing loosely is a principal feature of the present invention, since it makes the device work more easily and reduces breakage. When the lifter frame 3 is lowered as shown in Fig. 4 the prongs 25—32 spread and slide around the egg and against the cardboard separator strips S that form the side walls of the cell; but whenever the prongs meet resistance from either wall or egg they are free to yield and no undue pressure is created. Thus the prongs guide themselves into whatever space is available regardless of the position or size of the egg.

When the frame 3 has been lowered further so that the prongs 25—32 are around the lower part of the egg, it is necessary that the lower ends be drawn together and locked in place in order to hold the egg securely. This is accomplished as shown in Fig. 5 by moving the upper ends of the prongs 25—32 apart against the stop-bars 5 acting as fulcrums, which forces the lower tips of the prongs inward toward each other to grasp and hold the egg. The upper ends of the prongs 25—32 are forced apart by turning the rockshafts 22—31 in opposite directions and thus moving the cranks 23—30 to the horizontal position shown in Fig. 5 and Fig. 6. This is accomplished by moving the control lever 7—8 to the right in Fig. 1.

With the prongs 25—32 thus firmly braced against the stop-bars 5 and locked by the cranks 23—30, the egg can then be lifted from the cell S—F as shown in Fig. 6 and carried to wherever desired; and then can be released by returning the lever 7—8 to its original position at the left in Fig. 1. All the units operate similarly to that shown in Fig. 3–Fig. 6 and so a large number can be handled at one time.

Various other means may be employed to swing the prongs outward against maximum limit stops in order to close the lower ends of the prongs inward to grasp the egg. For example, in the modification shown in Fig. 8 and Fig. 9 the bar and shaft structure is reversed, with the stop-bars 5' acting as minimum limit stops (instead of maximum as in Fig. 5) and the rock-shafts 22' and 31' serve as the maximum limit fulcrums to force the prong tips inward in the final grasping of the egg. In Fig. 8 it will be seen that the rockshafts 22' and 31' are placed somewhat farther apart than in Fig. 1–Fig. 6 and that in the initial position the cranks 23'—30' are horizontal and toward each other, instead of the vertical position shown in Fig. 3. The dangling prongs 25—32 are held apart in the minimum position not by the shafts but by the stop-bar 5', so that the prongs will start smoothly to slide around the egg as they are lowered. On the other hand, as shown in Fig. 9, after the frame is lowered and the prongs are safely around the egg, their lower ends are contracted to hold it by turning the cranks 23'—30' to a vertical position and using the rockshafts 22'—31' as fulcrums to force the lower ends of the prongs inward to grasp the egg.

In any event, the principal feature that gives ease of operation is the fact that the prongs are entirely free to swing between the minimum and maximum positions when they are being slid into place, and are only limited in their minimum position to give a good start and in their final position to clamp, as distinguished from prior devices where the prongs were guided at intermediate points along their travel, or where there has been resort to flexible prongs in the hope of avoiding undue pressure. When there are say thirty-six units to be operated by a finger of the hand, the energy lost in guiding prongs at intermediate points or in flexing spring to avoid breakage all adds up to a fatigue which becomes noticeable during a day.

The device is particularly applicable to eggs, but of course can be applied to any other delicate structure having a rounded domed top and located in a rectangular hole where there is corner space for the prongs to enter.

While I have in the foregoing described certain specific forms by way of example, it will be understood that they are merely for the purpose of illustration to make clear the principles of the invention, which is not limited to the particular forms shown, but is susceptible to various modifications and adaptations in different installations as will be apparent to those skilled in the art without departing from the scope of the invention as stated in the following claims.

I claim:

1. In a lifter for a rounded domed object, the combination of a frame adapted to be moved toward and away from said object, curved prongs carried by said frame for grasping said object, a minimum limit stop for holding the prongs sufficiently open to start sliding around the domed object when initially engaging it, said prongs being pivoted to swing freely when sliding down around the object, a reversible drive for said prongs by which they can be contracted on the object so that it can be held and lifted by the frame, whereby prongs can be put around such domed object with the prongs loose during the engaging operation to reduce stresses on the prongs and object.

2. In a lifter for a rounded domed object, the combination of a frame adapted to be moved toward and away from said object, curved prongs carried by said frame for grasping said object, a minimum limit stop for holding the prongs sufficiently open to start sliding around the domed object when initially engaging it, a final lock for closing said prongs on the object, said prongs being pivoted to swing freely beyond said minimum limit stop up to said lock, whereby the prongs can slide freely around the domed object with the prongs loose to reduce stresses on the prongs and object, and the prongs then be locked so that the object can be lifted by the frame.

3. In a lifter for a rounded domed object, the combination of a frame adapted to be moved toward and away from said object, curved prongs carried by said frame for grasping said object, said prongs being rigid under normal operating loads and pivoted to swing under slight deflecting forces to guide themselves around the domed object, a minimum limit stop for holding the prongs sufficiently open to start sliding around the domed object when initially engaging it, and a reversible drive for locking the prongs on the object so that it can be held and lifted by the frame, whereby the object is protected from crushing stresses.

4. In a lifter for a rounded domed object in a rectangular hole, the combination of a pair of pivots movable in opposite directions toward and away from each other so as to approach or recede from the central axis of the rectangular hole, a reversible drive for simultaneously moving the pivots of said pair in said opposite directions, a pair of curved prongs loosely mounted in each of said pivots so that they can swing freely during the movement of the pivots to guide themselves around said domed object, and stops to limit their motion, whereby gripping prongs can be inserted while loose to reduce crushing stresses on the object.

5. In a lifter for a rounded domed object in a rectangular hole, the combination of a pair of pivots movable in opposite directions toward and away from each other so as to approach or recede from the central axis of said rectangular hole, a reversible drive for simultaneously moving the pivots of said pair in said opposite directions, a pair of curved prongs loosely mounted in each of said pivots, said mounting being sufficiently loose to allow swinging of the prongs during the movement of the pivots so that the prongs guide themselves freely around said domed object, and stops to limit their motion, whereby gripping prongs can be inserted while loose to reduce crushing stresses on the object.

6. In a lifter for a rounded domed object in a rectangular hole, the combination of two pairs of rigid prongs adapted to be inserted around said object in said hole, movable pivots for said pairs of prongs by which they may be moved toward and away from each other, each pivot loosely supporting its pair of prongs at a balanced center supporting point, whereby the rigid prongs can guide themselves freely around the domed object when being inserted in the rectangular hole to reduce crushing stresses on the object, limit stops for said prongs, and a reversible drive for said pivots.

7. In a lifter for rounded domed objects in rectangular holes, the combination of a frame, a handle attached to said frame, parallel rockshafts on said frame, an operating linkage for said rockshafts, lifting units operated by said rockshafts, said units being spaced in accord with the spacing of said rectangular holes, the lifting unit comprising a pair of cranks movable in opposite directions thru a limited arc by a pair of said rockshafts, said pair of rockshafts serving a number of similar units, lifting prongs loosely mounted on said cranks whereby the cranks may swing them loosely toward and away from each other by partially rotating the rockshafts, and limiters for forcing the prongs to grasp the rounded domed object after the prongs are inserted around it in the rectangular hole, whereby resistance to the simultaneous inserting of a number of such units is reduced.

8. In a lifter for rounded domed objects in rectangular holes, the combination of a frame, a handle attached to said frame, parallel rockshafts on said frame, an operating linkage for said rockshafts, lifting units operated by said rockshafts, said units being spaced in accord with the spacing of said rectangular holes, the lifting unit comprising a pair of cranks movable in opposite directions thru a limted arc by a pair of said rockshafts, said pair of rockshafts serving a number of similar units, rigid lifting prongs loosely mounted on said cranks so that the cranks may swing them loosely toward and away from each other by partially rotating the rock shafts, and limiters for forcing the prongs to grasp the rounded object after the prongs are inserted around it in the rectangular hole, said limiters having outer fulcrums located between the pivots of said prongs and their tips so that when the pivots of the prongs are forced apart by the cranks the tips of the prongs are forced inward to grasp the object, said fulcrums coming in contact with the prongs only in their grasping position, the prongs being free from fulcrums during the initial inserting and sliding movements of the prongs so that they can guide themselves around the domed object without restraint by crank or fulcrum, whereby resistance to insertion is reduced.

References Cited in the file of this patent

UNITED STATES PATENTS

| Number | Name | Date |
|---|---|---|
| 851,631 | Swanson | Apr. 23, 1907 |
| 879,801 | Swanson | Feb. 18, 1908 |
| 1,422,185 | Dalitz | July 11, 1922 |
| 1,809,622 | Ellen | June 9, 1931 |